Sept. 6, 1966   R. F. MALAGODI ETAL   3,271,622
PIEZOELECTRIC BALLAST APPARATUS
Filed July 5, 1963   4 Sheets-Sheet 1
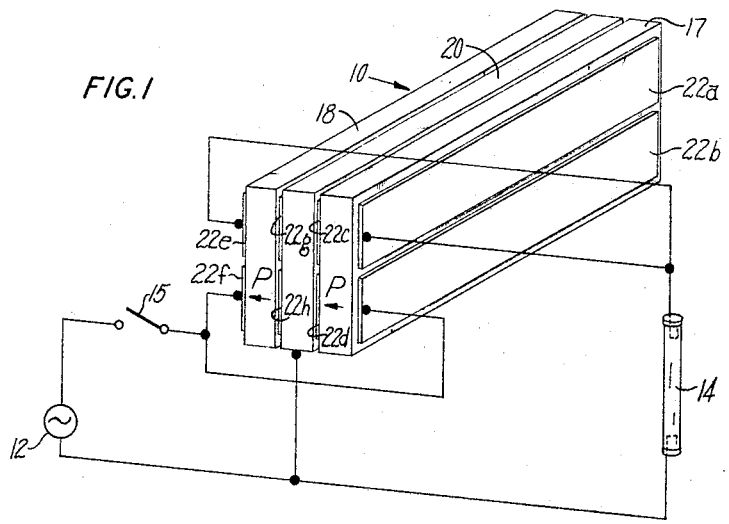
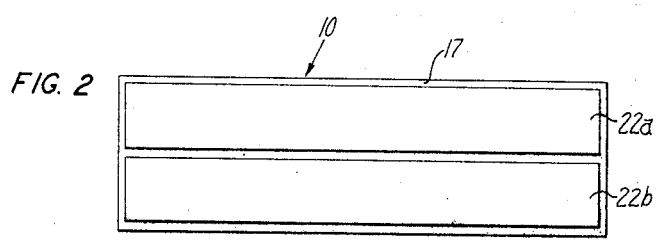
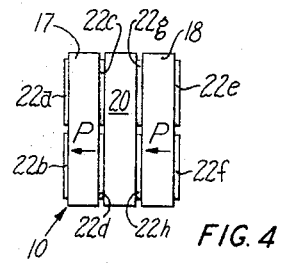
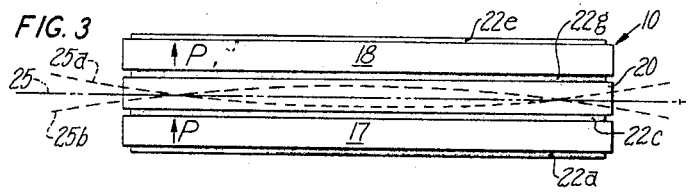
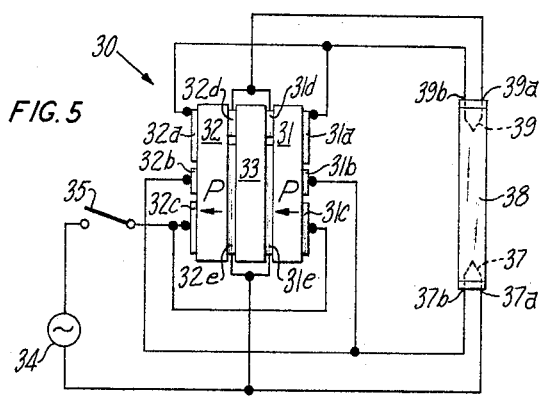
INVENTORS
ROBERT F. MALAGODI
PETER H. FOWLER
BY Lindsey, Prutzman and Hayes
ATTORNEYS

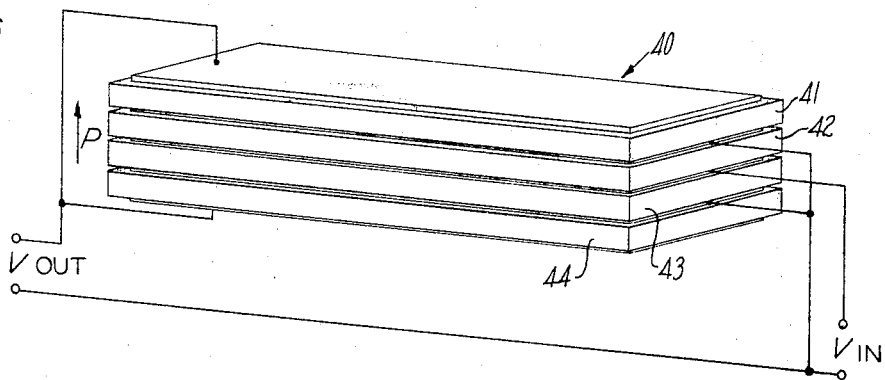
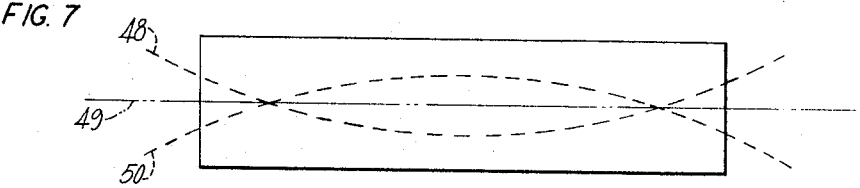
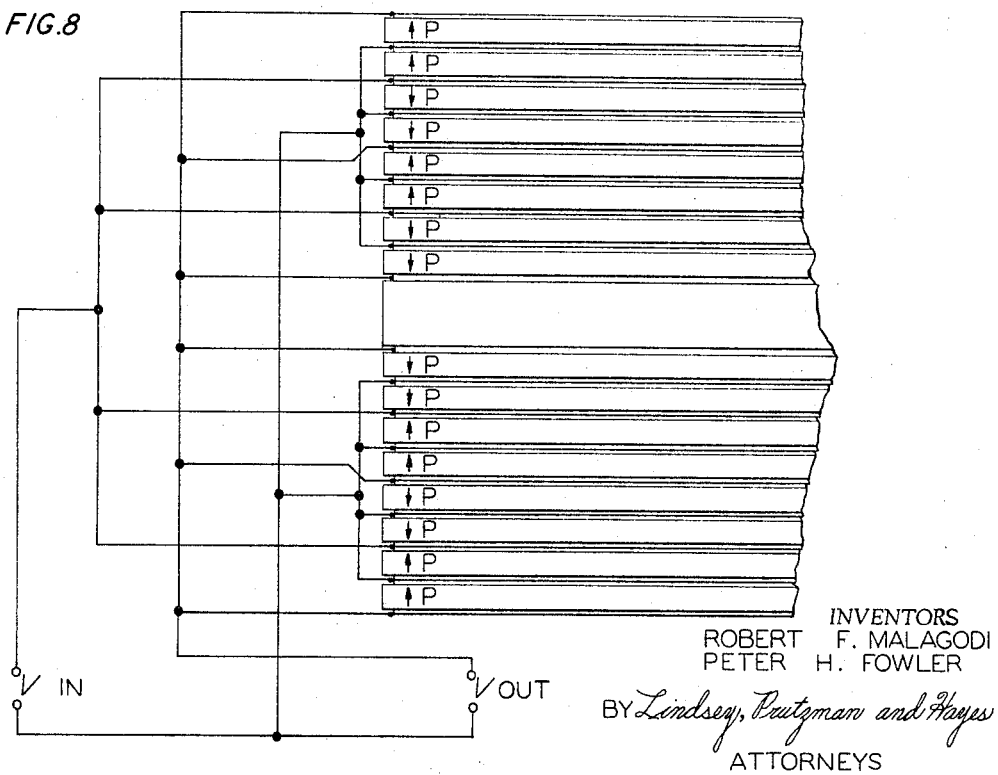

Sept. 6, 1966    R. F. MALAGODI ETAL    3,271,622
PIEZOELECTRIC BALLAST APPARATUS
Filed July 5, 1963    4 Sheets-Sheet 3
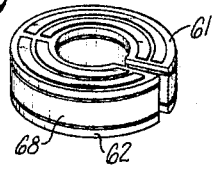
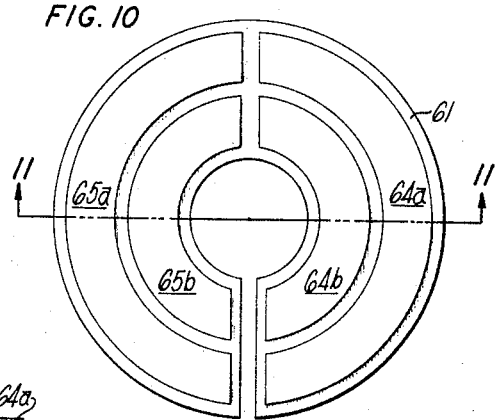
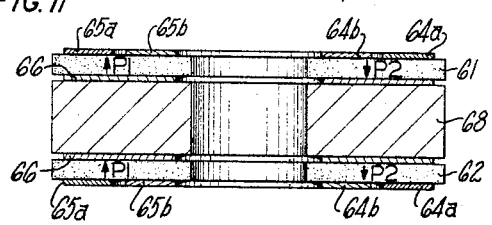
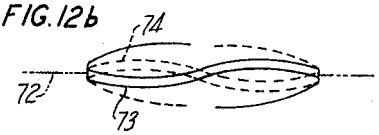
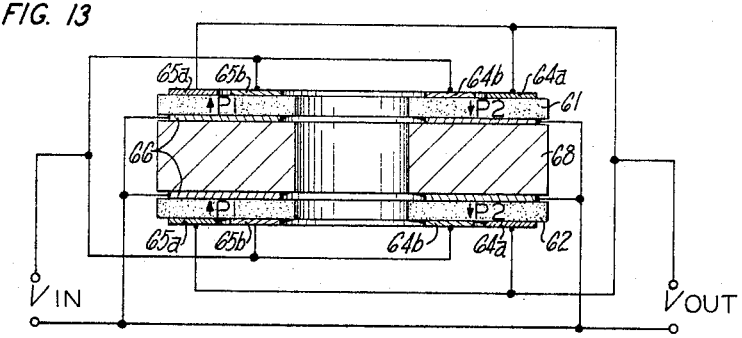
INVENTORS
ROBERT F. MALAGODI
PETER H. FOWLER
BY Lindsey, Prutzman and Hayes
ATTORNEYS Sept. 6, 1966    R. F. MALAGODI ETAL    3,271,622
PIEZOELECTRIC BALLAST APPARATUS Filed July 5, 1963    4 Sheets-Sheet 4

INVENTORS
ROBERT F. MALAGODI
PETER H. FOWLER

BY Lindsey, Prutzman and Hayes
ATTORNEYS

United States Patent Office 3,271,622
Patented Sept. 6, 1966

3,271,622
PIEZOELECTRIC BALLAST APPARATUS
Robert F. Malagodi, Boston, Mass., and Peter H. Fowler, Midland Park, N.J., assignors to Arthur D. Little, Inc., Cambridge, Mass., a corporation of Massachusetts
Filed July 5, 1963, Ser. No. 293,006
10 Claims. (Cl. 315—246)

This invention generally relates to apparatus particularly suitable for starting and operating gaseous discharge devices from an alternating current supply.

Gaseous or arc discharge devices such as fluorescent lamps have conventionally utilized apparatus including so-called "ballast" transformers connected to an alternating current source to provide the voltage or voltages required to initiate an arc to start the fluorescent lamp, while limiting the lamp current once the arc discharge has been established and such ballast transformers have been of the electromagnetic type and have included the use of laminated metal core structures and suitably insulated, plural-turn conductive windings.

It is a primary purpose of the present invention to provide improved ballast apparatus for starting and operating arc discharge devices and the like, which apparatus eliminates the need for electromagnetic core structures and multiple-turn conductive windings thereon.

It is a further object of the invention to provide improved ballast apparatus capable of starting conventional arc discharge lamps and limiting such lamp current after ignition while providing improved apparatus power factor, higher efficiency and lower noise while being lightweight, low in cost and reliable in operation.

It is a still further object of this invention to provide a piezoelectric transformer capable of operating at power frequencies to initiate the operation of arc discharge devices and to control the arc discharge device current subsequent to ignition; included within this object is the provision of such a transformer device having improved power factor, lightweight and quiet operation.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawings:

FIG. 1 is a schematic illustration of one embodiment of the ballast apparatus of this invention;

FIG. 2 is a side view of the ballast transformer of the apparatus of FIG. 1;

FIG. 3 is a top view of the ballast transformer of the apparatus of FIG. 1;

FIG. 4 is an end view of the ballast transformer of the apparatus of FIG. 1;

FIG. 5 is a schematic illustration of a second embodiment of the ballast apparatus of this invention;

FIG. 6 is a partial perspective view showing a four-layer piezoelectric transformer with electrical connections schematically indicated;

FIG. 7 is a schematic side view of the piezoelectric transformer of FIG. 6 with the mode of operation indicated in dotted lines;

FIG. 8 is a partial schematic view of a multiple layer piezoelectric transformer and showing the electrical connections thereto;

FIG. 9 is a perspective view of a split ring piezoelectric transformer;

FIG. 10 is a top plan view of the piezoelectric transformer of FIG. 9;

FIG. 11 is a cross-section view taken along the lines 11—11 of FIG. 10;

FIGS. 12a and 12b are schematic illustrations of a single layer of the split ring device of FIGS. 9–11 showing the mode of bending of the split ring;

FIG. 13 is a schematic diagram of the electrical connections to the transformer of FIG. 11;

Figure 14:
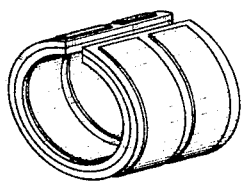
FIG. 14 is a perspective view of a split cylinder piezoelectric transformer.

Before proceeding with a detailed description of the present invention, it is to be observed that the term "piezoelectric" as referred to herein includes not only the naturally occurring polarized crystals; such as quartz and Rochelle salt but also the body of synthetically formed ceramic crystals such as barium titanate and lead zirconate which exhibit piezoelectric properties after proper polarization. These latter materials are commonly referred to as "ferroelectric" crystals, because of the hysteresis characteristics they display and are preferred in most applications over the naturally found piezoelectric substances because of the ease and economy of fabricating them, the rapid progress that has been made in the art of polarizing them and the significantly higher electromechanical coupling coefficients which they possess.

The present invention generally provides ballast apparatus using piezoelectric devices capable of operating as transformers for alternating current at power frequencies, the device itself being mechanically resonant at or near the power frequency and being provided with appropriately placed electrodes such that the bending mode of vibration is excited by the physical distortions that are produced when the device is subjected to alternating electric fields obtained through proper connection of the electrodes to a source of alternating current.

Turning now to the drawings and particularly FIGS. 1–4 thereof, there is illustrated an embodiment of the ballast apparatus of this invention wherein a piezoelectric transformer generally designated 10 is connected to a suitable A.C. power source 12 and to a fluorescent lamp-type gas discharge device 14 so as to provide ignition of the lamp 14 upon closure of the switch 15. This lamp is of the "instant-start" type and the transformer 10 acts to limit the lamp current after ignition. The transformer 10 comprises two sheets 17 and 18 of a ferroelectric ceramic (lead zirconate, barium titanate, etc.) suitably polarized in the direction of the arrow P, the polarization being obtained in any well-known manner such as by the application of strong electrostatic fields while the ceramic is heated and then cooled. The sheets 17 and 18 are bonded to an inert spacer 20 as by cementing or the like to provide a three element sandwich in which each element is mechanically coupled to the other so as to be forcibly constrained to move together with the same amplitude. The spacer 20 in the illustrated embodiment is a conductive element generally a thin foil although it may be of substantial thickness to modify the mechanical stresses applied to the ceramic sheets 17 and 18.

Each ceramic sheet is provided with electrodes 22 which are applied to the crystals in any suitable manner; such as by spraying, diffusing, etc., and in the illustrated embodiment the ceramic sheet 17 has a pair of outer electrodes 22a and 22b and a pair of inner electrodes 22c and 22d. The corresponding electrodes on the sheet 18 are designated 22e, 22f, 22g, 22h respectively.

The conductive spacer 20 when formed as a thin foil serves only to connect the inner electrodes 22c and d of sheet 17 to the inner electrodes 22g and h of sheet 18 as well as to serve as one terminal of the ceramic transformer.

FIG. 1 illustrates apparatus including a so-called "instant-start" fluorescent lamp and it is seen that the conductive spacer 20 is connected to one terminal of the source 12 and one terminal of the gas discharge lamp 14. The other terminal of the source 12 is connected through on-off switch 15 to the outer electrodes 22b and 22f. Electrodes 22a and 22e are connected together and to the remaining terminal of the lamp 14.

The vibration of the two ceramic sheets 17, 18 of the transformer 10 occurs in the bending mode and this bending is induced by the electrical circuit arrangement in which, on each one-half cycle of A.C. source 12, the electric field between electrodes 22b and 22d as well as between 22f and 22h is in the same direction as the polarization in one ceramic layer and opposite to it in the other. This causes one ceramic layer to expand and the other to contract and because the pieces are constrained to move together, the composite transformer bends in somewhat the same manner as a bimetallic strip. This action is shown for illustrative purposes in FIG. 3 wherein the center line 25 will assume the position shown in dotted line 25a on one-half cycle and 25b on the other half cycle of source voltage applied to the electrodes as shown in FIG. 1. If the dimensions of each bar or sheet (17 and 18) are selected such that the natural frequency of the bar in bending is the same as the frequency of the applied alternating current voltage, a large amplitude of motion will be produced. This motion is also experienced by the material between the output electrodes 22a and c, and 22e and g and because of the piezoelectric action, a large alternating voltage is produced at these electrodes which voltage is applied directly to the terminals of lamp 14. When the lamp current builds up after lamp ignition, the added electrical load on the transformer tends to alter the resonant frequency and the amplitude of vibration adjusts so as to limit the current drawn by the lamp while maintaining the voltage necessary to maintain the arc.

The ballast apparatus of this invention includes within its purview the ignition and operation of so-called "rapid-start" fluorescent lamps wherein preheating of the lamp is utilized to assist in the starting of the lamp. Referring to FIG. 5 wherein the present invention is shown for use with such a load device it is seen that the transformer, generally designated 30, comprises two polarized ceramic sheets 31 and 32, each sheet being provided with three electrodes 31a, b, c, and 32a, b, c respectively along the outer surfaces thereof, and two electrodes 31d and e and 32d and e along the inner surface thereof. In this embodiment, however, the electrodes 31d, 32d must be insulated from the electrodes 31e, 32e and a nonconducting inert spacer 33 is utilized. It being understood, however, that the spacer can be eliminated if desired, but the electrical insulation function must be retained.

The sheets 31 and 32 are polarized in the direction shown by the arrow P and are bonded together through their length in any suitable manner so as to be constrained for movement together. One side of the A.C. power source 34 is connected through the on-off switch 35 to the electrodes 31c and 32c. The other side of the source 34 is connected to the electrodes 31e and 32e. Terminal 37a of the heater filament 37 of the rapid-start lamp 38 is connected to the electrodes 31e, 32e. The terminal 37b of filament 37 being connected to the electrodes 31b, 32b. The terminal 39a of heater filament 39 is connected to 31d and 32d; terminal 39b is connected to 31a and 32a.

In the same manner of operation as described for the embodiment of FIGS. 1–4, the embodiment of FIG. 5 commences operation when the switch 35 is closed to apply the source excitation voltage between the electrodes 31, 32c and 31, 32e. The direction of the electric field is the same as that of the polarization in one layer and opposite in the other such that transformer 30 vibrates in the bending mode. The output taken between the electrodes 31a, 32a and 31e, 32e provides the high voltage for starting of the lamp and the limited current for operating the lamp. The preheat current for the lamp filaments or cathodes is obtained for filament 37 between the electrodes 31, 32b and 31, 32e and for filament 39 between the electrodes 31, 32a and 31, 32d. As heretofore pointed out, the inner electrodes d and e of the present invention must be electrically isolated such that the center spacer 33 (if used) must be fabricated from an insulating material.

The structural techniques described in connection with the foregoing embodiments of this invention can be utilized in connection with multiple layer transformers having more than two piezoelectric sheets. These same techniques can produce a wide variety of electric circuit possibilities depending upon the particular electrode arrangements, ceramic sheet poling directions, etc., that are utilized. The ballast transformer of FIG. 6 is illustrative of a 4-layer piezoelectric transformer operating in the bending mode. The transformer generally designated 40 is illustrated as having four ceramic elements 41, 42, 43, and 44 each of which is provided with an electrode on its upper and lower surface and each of which is bonded together with the direction of polarization as shown by the letter P. No spacing elements are disclosed in this particular transformer (although such spacers can be utilized if desired) and electrical connections are established to the transformer such that the uppermost and lowermost (outside) electrodes are joined together to form one terminal of the output. The center electrode layer is connected as one terminal of the input and the two remaining electrode layers are joined together to form the common input and output terminals.

The operation of this device is essentially the same as that described for the transformer of FIGS. 1–3. The ceramic elements 42 and 43 being driving elements, the ceramic elements 41 and 44 being driven elements such that the composite ceramic structure vibrates in the bending mode between the dotted line limits 48 and 50 with the center line 49 being the reference. It is to be understood that the input and output terminals have been arbitrarily designated and these designations can be interchanged as desired as with conventional transformer terminology.

It has been found that the load current available from the ceramic transformer of this invention is related to the surface area of the ceramic layers (and the electrode areas) and that increasing this area produces a proportional increase in the available output current. FIG. 8, diagrammatically illustrates means for accomplishing an increased output current by providing a 16-layer device wherein the layers are arranged in groups of 8 separated by an inert separator (optional), each layer being polarized in the direction shown by the arrows P, each layer being electroded on both sides. As with the prior embodiments, all the layers are constrained to move together. It will be observed from FIG. 8 that adjacent pairs of layers are oppositely polarized (as shown by arrows P) with alternate electrode surfaces being connected together to provide a common input and output terminal. The remaining output terminal is obtained by connecting the outermost electrodes of the transformer to the center and the bottom electrodes of each layer. The remaining electrodes are connected to form the other input terminal. Other configurations and electrode arrangements are, of course, possible, but the arrangement shown in FIG. 8 describes a multilayer bending transformer which does not require electrical insulation between the layers.

In addition to varying the size and number of layers to obtain various modifications of the disclosed bending mode piezoelectric transformer, it has been found that the shape of the transformer can be varied while still retaining the desirable characteristics of a device. FIGS. 9–13 illustrate one such variation wherein each ceramic layer is in the form of a split ring having a generally C-shape. The illustrated device comprises two ceramic layers 61 and 62, each of which is provided with two pairs of semicircular concentrically arranged electrodes 64a and b and 65a and b on one side thereof and a single electrode 66 on the other side thereof. The single electrode side of the ferroceramic sheets 61 and 62 are suitably bonded either directly together or to a spacer 68. As viewed in FIG. 11, the left hand semicircular portion of each disc is polarized in the direction P1; whereas, right hand semicircular section is oppositely polarized in the direction P2. When suitably excited, each layer deflects in the bending mode in a manner generally shown in FIG. 12a, such that alternating energization of opposite polarity of excitation produces movement of each layer from a normal center line position 72 to the dotted line limits 73, 74 of FIG. 12b.

Suitable electrical connections are established to the electrodes as shown in FIG. 13, the inner semicircular electrodes 64b, 65b on each layer are connected together to form one terminal of the transformer input. The other terminal of the input and one terminal of the output are obtained by connecting the electrodes 66 together. The electrodes 64a, 65a on each layer are connected together to form the other terminal of the output. As previously described, the input and output terminals can be reversed as in conventional transformer practice and additional electrodes can be applied to the surface of the ceramic layers to provide additional output voltages suitable for use in energizing heater or cathode elements as described in connection with the device of FIG. 5 or for such other purpose as may be desired.

Figure 15:
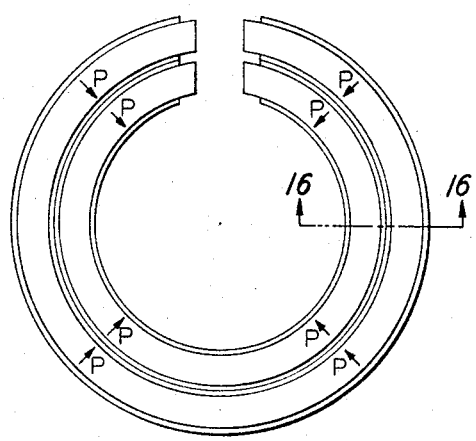
FIG. 15 is an end view of the transformer of FIG. 14 with the mode of operation indicated by arrows.
Figure 16:
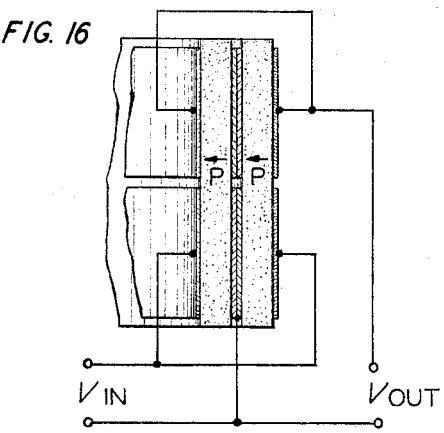
FIG. 16 is a schematic diagram of the electrical connections to the transformer of FIG. 14, the transformer being shown in cross-section along the lines 16—16 of FIG. 15 for convenience.

A still further variation of this invention which is illustrative of the variations possible in the configuration of the ceramic layer is illustrated in FIGS. 14–16 wherein there is disclosed a split cylinder-type ceramic transformer which is, in reality, the same transformer that is shown in FIGS. 1–3 but "rolled up" in the form of a cylinder. Polarizations, electroding and deflection are as shown in FIGS. 14 and 15 and the circuit utilized to connect the electrodes is substantially identical with that shown in FIG. 1.

It has been also found that the characteristics of the ferroceramic ballast transformer can be improved for use under certain operating conditions by mechanically prestressing the ceramic layers in compression, compression being preferred because the material will withstand much greater strains in compression than in tension. A convenient way of achieving such compression is to assemble the ceramic layers to the spacer while the spacer is under tension. Thus when the tension force on the spacer is removed, it will return to its original length and the ceramic layers will be stressed in compression.

It is to be observed that the thickness of the electrodes has been exaggerated in the drawings for purposes of clarity and that all relative dimensions in the drawings are merely illustrative. In actual practice, a typical ceramic layer may be several inches in length and a few tenths of an inch in thickness with the electrodes only film thickness on the ceramic layer.

From the foregoing description, it is seen that the ballast apparatus of this invention not only provides an improved power transformer that eliminates conventional cores and windings normally associated with electromagnetic devices but also provides a desirable "ballast" effect while improving efficiency and power factor while lowering noise, heat, etc. Additionally, this ballast transformer permits improved control of gas discharge devices while simplifying circuit considerations.

As will be apparent to persons skilled in the art, various modifications and adaptations of the structure described will become readily apparent without departure from the spirit and scope of the invention, the scope of which is defined in the appended claims.

We claim:
1. Ballast apparatus for starting and operating a "rapid start" flourescent lamp from an alternating current supply comprising a flourescent lamp having heater filaments at each end thereof, a pair of piezoelectric sheets each sheet having first, second and third spaced electrodes on one surface thereof and fourth and fifth electrodes on the opposite surface thereof, the first and second electrodes being located opposite the fourth electrode and the third electrode being located opposite the fifth electrode, each sheet being oppositely polarized in the thickness direction, means securing the fourth and fifth electrode sides of the sheets together with the electrodes insulated from each other to forcibly constrain the sheets for movement together, the body formed by the joined sheets being mechanically resonant at the approximate frequency of the alternating current supply, means connecting one of the lamp heater filaments between third electrode of each sheet and the fifth electrode of each sheet, means connecting the other lamp heater filament between the second electrode of each sheet and the fourth electrode of each sheet, means for connecting the first and fourth electrodes of each sheet to the alternating current supply whereby on each one-half cycle of applied alternating current voltage, the electrostatic field between the electrodes connected to the alternating current supply is in the same direction as the polarization of one sheet and opposite to the direction of the polarization of the other sheet thereby to bend the composite body and generate the lamp ignition voltage between the third and fourth electrodes and the lamp preheat current between the third and fifth and between the second and fourth electrodes respectively, the load current of the lamp being limited by alteration of the resonant frequency characteristics of the composite body caused by build-up of lamp current after ignition.

2. The apparatus as set forth in claim 1 wherein said piezoelectric sheets are separated by an inert insulating spacer and said sheets are secured thereto, said spacer holding said sheets under compression along an axis normal to the direction of polarization.

3. Ballast apparatus for starting and operating a gaseous discharge device from an alternating current supply comprising piezoelectric means mechanically resonant in bending at the approximate frequency of the alternating current supply, input electrode means secured to one portion of the piezoelectric means, output electrode means secured to a second portion of the piezoelectric means spaced from said first portion, means for connecting said input electrode means to a source of alternating current, said piezoelectric means being polarized such that upon energization of the input electrode means, said piezoelectric means vibrates in the bending mode to mechanically stress the second portion of said piezoelectric means, and means for connecting said output electrode means to the ignition terminals of the gaseous discharge device whereby the voltage developed between the output electrode means starts the device, the load current of the device being limited by alteration of the resonant frequency characteristics of the piezoelectric means caused by build-up of the output electrode current after starting.

4. The apparatus of claim 3 wherein said piezoelectric means comprises a plurality of coextensive piezoelectric sheets constrained for simultaneous movement together, each sheet being polarized in the thickness direction, and wherein said output electrode means and said input electrode means comprise discrete electrodes secured to each sheet.

5. The apparatus of claim 3 wherein said piezoelectric means comprises a plurality of rectangular coextensive piezoelectric sheets constrained for simultaneous movement together, each sheet being polarized in the thickness direction, two adjacent sheets being driving elements and having the input electrode means thereon and at least one additional sheet being a driven element and having the output electrode means thereon.

6. Ballast apparatus for starting and operating a gaseous discharge device from an alternating current supply comprising a ballast transformer including two piezoelectric sheets, each of said sheets having first and second electrodes along one surface thereof and a third electrode along the opposite surface thereof, said sheets being oppositely polarized in the thickness direction, means securing the third electrode side of said sheets together to form a body with the respective first and second electrodes in parallel relationship to forcibly constrain the sheets for movement together, said body being mechanically resonant at the approximate frequency of the alternating current supply, means for connecting the first electrode on each sheet to a source of alternating current and the second electrode on each sheet to one terminal of the gaseous discharge device, means for connecting the third electrodes on each sheet to the other side of the alternating current source and to the other terminal of the gaseous discharge device whereby on each half cycle of applied alternating current voltage, the electric field between the electrodes connected to the alternating current source is in the same direction as the polarization of one sheet and opposite to the direction of the polarization of the other sheet thereby to bend the body and generate an ignition voltage across the terminals of the gaseous discharge device, the load current of the device being limited by alteration of the resonant frequency characteristics of the body caused by build-up of the electrode current after ignition.

7. The ballast apparatus of claim 6 wherein each sheet has the configuration of a split cylinder and the electrodes extend along the circumference thereof.

8. The ballast apparatus of claim 6 wherein a conductive spacer is disposed between the piezoelectric sheets and secured thereto.

9. A ballast transformer for starting and operating a gaseous discharge device from an alternating current supply comprising two coextensive piezoelectric sheets, each of said sheets having an input and two output electrodes on one side thereof and two additional electrodes on the other side thereof, said sheets being oppositely polarized in the thickness direction, means securing the sheets together to form a body forcibly constraining the sheets for movement together, said body being mechanically resonant at the approximate frequency of the alternating current supply, means for connecting the input electrode and one of the additional electrodes on each sheet to a source of alternating current so that one sheet expands and the other contracts during each one-half cycle of the source voltage, and means for establishing electrical connections to the two output electrodes and to the other additional electrode thereby to provide plural transformer output voltages, electrodes of different operating voltages being insulated from each other.

10. The apparatus of claim 4 wherein each sheet has the configuration of a split-ring, wherein input and output electrodes are secured to each semicircular portion thereof, said electrodes being concentrically arranged and wherein the semicircular portions of each sheet are oppositely polarized.

References Cited by the Examiner

UNITED STATES PATENTS 3,132,286    5/1964    Harrison _____ 315—55

JOHN W. HUCKERK, *Primary Examiner.*

J. D. CRAIG, *Assistant Examiner.*